Dec. 20, 1955 M. E. DAUER 2,727,269
TEAT CUP CLEANER
Filed April 13, 1954

INVENTOR.
MILTON EUGENE DAUER
BY
Brown, Critchlow, Flick & Peckham
HIS ATTORNEYS

United States Patent Office 2,727,269
Patented Dec. 20, 1955

2,727,269

TEAT CUP CLEANER

Milton Eugene Dauer, St. Marys, Pa.

Application April 13, 1954, Serial No. 422,877

5 Claims. (Cl. 15—236)

This invention relates to inflations or teat cups for milking machines, and more particularly to implements for cleaning the inside of the cups after they have been used.

Milking machines use long tubular teat cups made of flexible material, such as rubber. Sometimes they are called inflations. These cups are removably mounted in metal receptacles, and then air under pressure is introduced periodically into the receptacles to compress the cups in a well-known manner to milk the cow. After milking has been completed, it is necessary to clean and sterilize the cups. In the past this has been done with brushes, but difficulty has always been experienced in cleaning congealed milk from the concave lower end of the cup and the upper part of the tube that leads from it to the milk receiver. This difficulty is caused principally by the bristles on the shoulders of the brushes breaking off or bending around the stem of the brush. Although the teat cups are supposed to be removed from the metal receptacles for cleaning purposes, that is not always done. As a result, it sometimes happens that cracks or folds that may form in the cup are not discovered until after they have bruised a cow's teats and caused mastitis.

It is among the objects of this invention to provide a sanitary teat cup cleaner which quickly and effectively cleans the inside of such a cup and the upper end of the milk tube leading from it, which will indicate if the side wall of the cup has become cracked or creased, which is very strong and durable, and which is easy to keep clean.

In accordance with this invention the teat cup cleaner has an elongated scraper that is inserted down into a flexible teat cup and is turned by a handle connected to the upper end of the scraper. The scraper is formed from a plurality of blades radiating from its axis of rotation. The blades have longitudinal edges for engaging the inside of the cup, these edges converging downward and having inwardly offset lower portions connected to the portions above by curved shoulders that conform to the concave bottom of the cup. The cleaner preferably is formed from two metal strips that are bent lengthwise along their center lines to form the blades. The strips are joined together along their center lines. The handle is formed from continuations of the blades which are curved laterally to form rounded surfaces that will not cut the hand when the handle is gripped.

Figure 1:
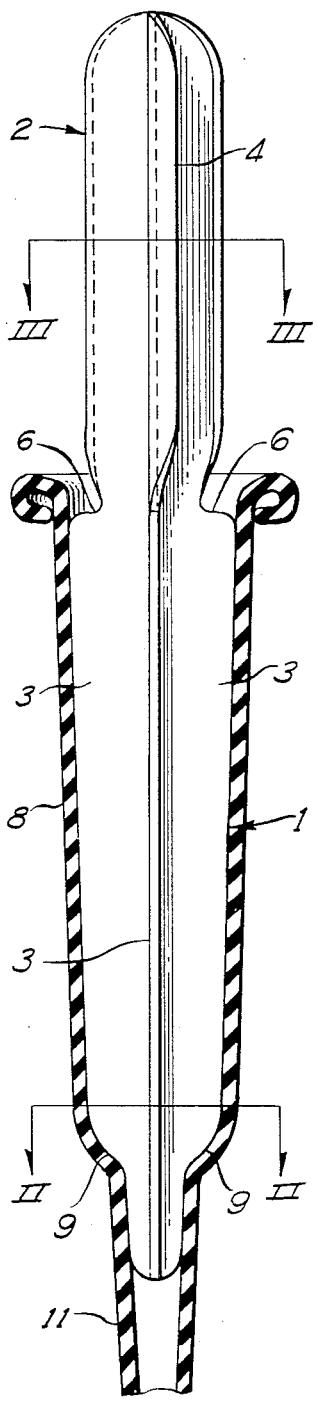
Figure 3:
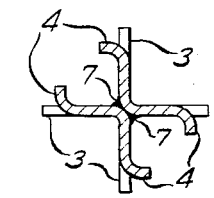
Figure 4:
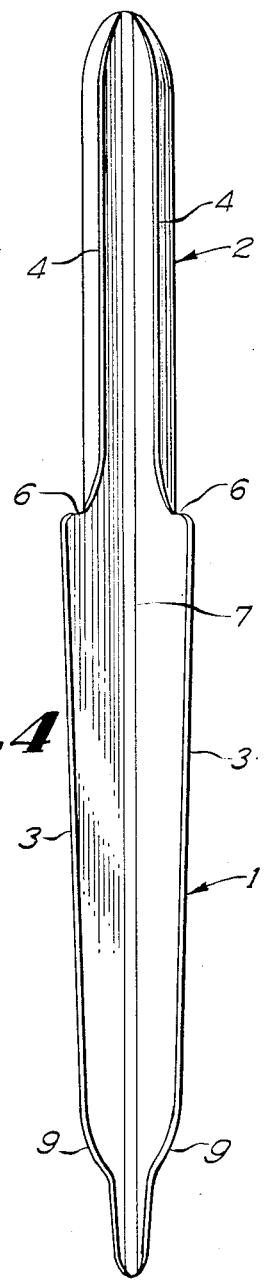
Figure 2:
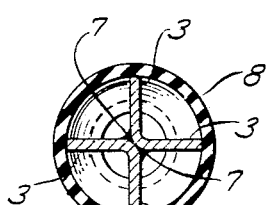

The preferred embodiment of the invention is illustrated in the accompanying drawings, in which Fig. 1 is a side view of the cleaning implement inside of a teat cup shown in section;

Figs. 2 and 3 are horizontal cross sections taken on the lines II—II and III—III, respectively, of Fig. 1; and Fig. 4 is a side view of the cleaner turned 45° from its position in Fig. 1.

The cleaning implement disclosed herein is described for convenience in a vertical position with its handle at the top, but it is to be understood that the cup and cleaner can be held in any desired position during the cleaning operation.

Referring to the drawings, the cleaner has two parts; a lower elongated scraper 1 and an upper handle 2 integrally connected with the scraper for turning it. The scraper has a number of blades 3, preferably four, which radiate from its central vertical axis or axis of rotation. Most suitably, the blades are formed from straight strips of corrosion resistance metal which have been bent lengthwise along their center lines. Each strip therefore forms two blades. When only two strips are used, each strip is bent at right angles to itself. The two strips then are placed back to back along their center lines as shown in Figs. 2 and 3 and held with the blades at 90° intervals until the strips can be joined together, preferably by spot welding at longitudinally spaced points.

The handle 2 above the blades is formed from continuations of the metal strips. To prevent the edges of the handle from cutting the hand gripping it, the marginal portions of the handle strips are curved laterally to form smooth rounded surfaces 4, as shown in Fig. 3. To facilitate this bending of the handle, the metal strips are provided with notches 6 at the upper ends of the blades. As the joint or seam between the two strips would be difficult to clean, the opposite sides of the seam are filled throughout the length of the implement with brazing or soldering metal 7 so that the tool presents a smooth unbroken surface.

The side or longitudinal edges of the scraper blades are adapted to engage the inside of the downwardly tapered flexible cup 8 and therefore converge downward to the same extent as the cup. The lower portions of the blade edges are offset inwardly and are connected with the portions above them by curved shoulders 9. The reduced lower end of the scraper formed by these narrower blade portions fits tightly in the upper end of the flexible tube 11 that leads from the central hole in the bottom of the teat cup to a suitable vessel (not shown) that receives the milk, while the curved shoulders fit snugly against the concave inner surface of the bottom of the cup.

When the scraper is turned by means of the handle, the edges of the blades scrape the inside of the cup clean, including the concave bottom and the upper portion of the milk tube 11 that have been so difficult to clean in the past. If the wall of the cup is cracked or creased or folded, the edges of the blades will catch on the irregularity and thereby indicate that something is wrong. The cup then can be discarded before it does any damage.

It will be seen that the cleaning implement or tool disclosed herein can perform the operation for which it is intended in a thorough manner. The tool itself is strong and durable and easy to clean. Its construction is relatively simple and inexpensive, and there is nothing about it to wear out as brushes do. In addition to its cleaning function, it also indicates when a teat cup requires replacing.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A teat cup and tube cleaner comprising an elongated scraper adapted to be inserted down into a flexible cup, a handle connected to the upper end of the scraper for turning it in the cup, the scraper being formed from pairs of blades radiating from its axis of rotation and having longitudinal edges for engaging the inside of the cup and adjoining portion of the tube, each pair of blades being formed from a metal strip bent lengthwise along its center line, and means joining said strips together along their center lines, said edges converging downward and having inwardly offset tube-cleaning lower portions connected with the portions above by curved shoulders.

2. A teat cup cleaner as defined in claim 1, in which said means is metal that fills the sides of the seam between said strips.

3. A teat cup cleaner as defined in claim 1, in which said handle is formed by continuations of said strips above the blades, the marginal portions of said continuations being curved laterally to form laterally spaced curved surfaces for gripping by the hand.

4. A teat cup cleaner as defined in claim 3, in which said strips are notched between the upper ends of the blades and the curved portions of the handle.

5. A cleaner for the inside of a teat cup and the upper portion of the milk tube joined to the outlet opening in the concave bottom of the cup, said cleaner comprising an elongated scraper adapted to be inserted down into the cup and formed from two pairs of blades having longitudinal edges for engaging the inside of the cup and the adjoining portion of the tube, said edges converging downward and having inwardly offset lower portions adapted to extend down into the tube, said lower portions being connected with the edge portions above by curved shoulders adapted to engage the concave bottom of the cup, each pair of blades being formed from a strip bent lengthwise along its center line, and means joining the strips together along their center lines and sealing the opposite sides of the seam between the strips, said strips extending above the blades to form a handle for turning the scraper in the cup to clean it, the marginal portions of each strip above the blades being curved laterally to form four circumferentially spaced rounded surfaces for gripping in the hand.

References Cited in the file of this patent
UNITED STATES PATENTS

| | | |
|---|---|---|
| 1,837,484 | Reimer | Dec. 22, 1931 |
| 2,294,096 | Rice | Aug. 25, 1942 |
| 2,634,497 | Waldesbuehl | Apr. 14, 1953 |